INVENTOR.
ALFRED B. KLEINGERS, JR.,
BY
ATTORNEYS.

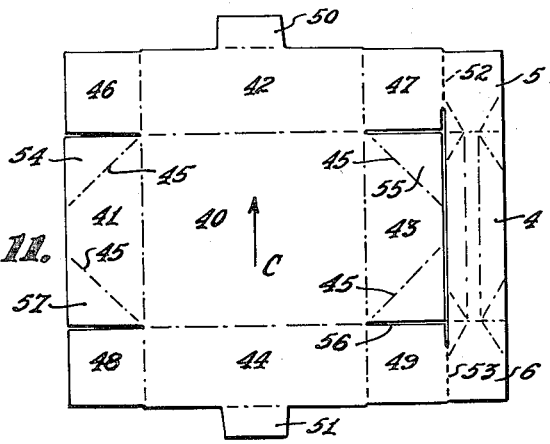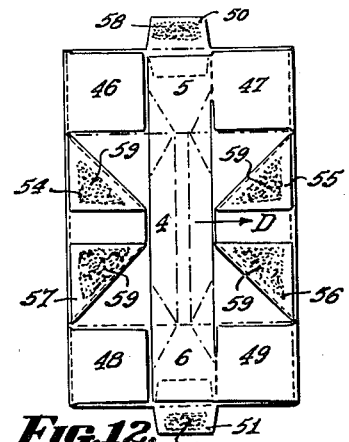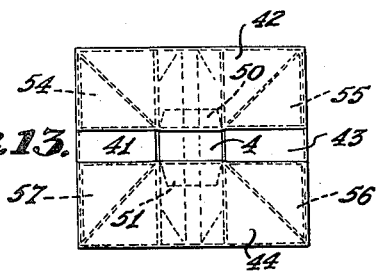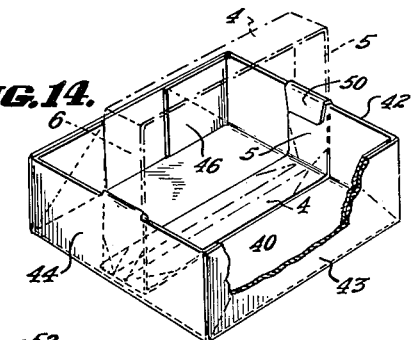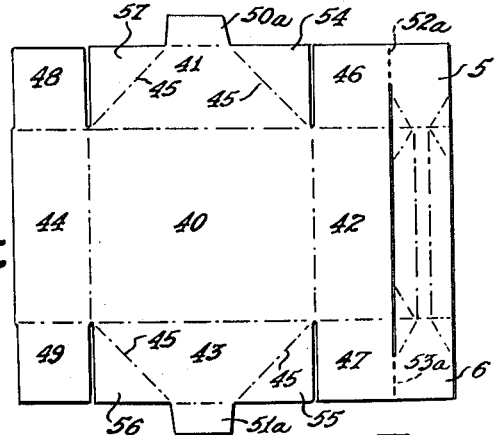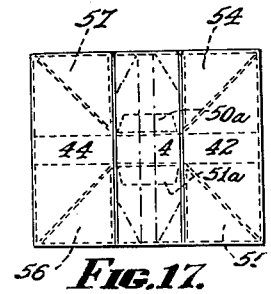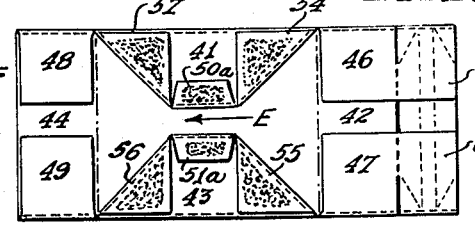

Dec. 22, 1959 A. B. KLEINGERS, JR 2,918,206
HANDLE STRUCTURES FOR BOXES AND METHOD OF FABRICATING SAME
Filed Oct. 18, 1955 3 Sheets-Sheet 3
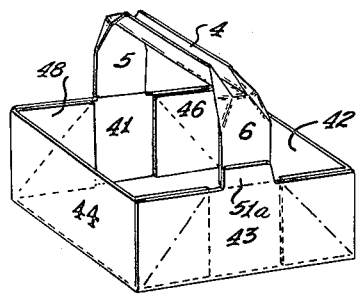
INVENTOR.
ALFRED B. KLEINGERS, JR.,
BY
ATTORNEYS.

United States Patent Office 2,918,206
Patented Dec. 22, 1959

2,918,206

HANDLE STRUCTURES FOR BOXES AND METHOD OF FABRICATING SAME

Alfred B. Kleingers, Jr., Middletown, Ohio, assignor to The Interstate Folding Box Company, Middletown, Ohio, a corporation of Ohio Application October 18, 1955, Serial No. 541,217

7 Claims. (Cl. 229—52)

My invention relates to boxes provided with carrying handles, and more particularly to improved handle structures which may be formed and fabricated either as an integral part of the box blank or as a separate element for subsequent attachment to the box with which the handle structure is to be used.

Basically, my invention contemplates the formation of handle structures from sheet material such as paperboard, boxboard or the like, the sheet material being suitably cut and scored to provide an initially planar handle member. Yet the construction of the handle member is such that, upon movement to the carrying position or upon gripping of the handle by the user, the planar structure will be folded longitudinally to provide, in effect, a three-dimensional reinforced handle. In other words, in accordance with my invention, an initially flat strap-like carrying handle is converted by folding along predetermined lines of fold into a reinforced structure having board faces extending in planes which are angularly related with respect to the plane of the flat handle.

A further object of my invention is the provision of a strap-like handle structure which may be formed as an integral part of the box with which it is to be associated, the handle structure being adapted to be folded and glued along with the box blank.

Still a further object of my invention is the provision of a handle structure which is severably attached to a side edge of the box blank, the folding and gluing of the box blank resulting in the automatic positioning of the handle in its ultimate position of use, the handle being secured to the blank in its position of use as an incident of the folding and gluing of the blank.

Still a further object of my invention is the provision of a handle structure of the character described which is fabricated as a part of the knock-down box structure and which is automatically erected to carrying position upon the erection of the box blank.

Yet a further object of my invention is the provision of a handle structure the carrying portion or bail of which is adapted to be folded upon at least one longitudinally extending score line to provide angularly related handle parts which act to reinforce and strengthen the handle.

These and other objects of my invention which will appear hereinafter or which will be apparent to the skilled worker in the art upon reading these specifications, I accomplish by those constructions and arrangements of parts and by those procedures of which I shall now describe certain exemplary embodiments.

Referring now to figures of the drawings:

Figure 11 is a plan view of a modified form of box blank and a handle structure associated therewith.

Figures 12 and 13 illustrate successive stages in the folding and gluing of the box blank and handle structure of Figure 11.

Figure 14 is a perspective view with parts broken away of the erected box.

Figure 15 is a plan view of yet another form of box blank having an associated handle structure.

Figure 16 illustrates the blank of Figure 15 in initially infolded condition.

Figure 17 is a plan view illustrating the blank of Figure 15 in the knocked-down or flat-folded condition.

Figure 18 is a perspective view with parts broken away illustrating the flat-folded blank in an intermediate stage of erection.

Figure 19 is a perspective view illustrating the blank in the fully erected condition.

Figure 20 is a plan view of a handle structure in accordance with my invention.

Figure 21 is a perspective view illustrating the handle of Figure 20 associated with a container.

Figure 22 illustrates an alternative form of handle member.

Figure 23 illustrates the handle structure of Figure 22 associated with a box structure.

Figure 24 illustrates yet another form of handle structure which may be employed.

Figure 25 illustrates the handle structure of Figure 24 associated with a box of the suit-box variety.

Figures 1, 2, 8:
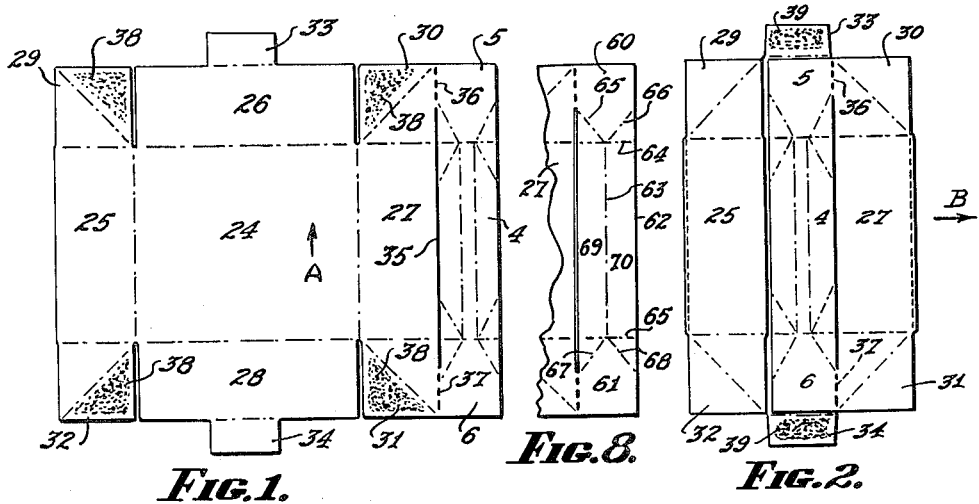
Figure 1 is a plan view of a box blank for a knock-down box, the blank including a severably connected handle structure in accordance with my invention.
Figure 2 is a plan view illustrating the blank of Figure 1 in infolded position.
Figure 8 is a partial plan view illustrating an alternative form of handle structure.

Referring first to Figure 20 of the drawings, I have therein illustrated a preferred form of handle structure in accordance with my invention. Essentially, the handle is formed from an elongated strip of paperboard 1 divided by transverse score lines 2 and 3 to provide an intermediate or bail forming portion 4 and outer or leg forming portions 5 and 6. Spaced apart longitudinal score lines 7 and 8 extend between the transverse score lines 2 and 3 and divide the bail forming portion 4 into a center part 9 and wing parts 10 and 11. Diagonal score lines 12 and 13 extend outwardly through the wing part 10 from the ends of the longitudinal score line 7, and similar diagonal score lines 14 and 15 extend outwardly through the wing part 11. Similarly, pairs of diagonal score lines 16, 17 extend outwardly from the ends of the longitudinal score line 7 through the leg forming portions 5 and 6, and corresponding score lines 18 and 19 extend outwardly through the leg portions from the ends of the longitudinal score line 8.

The handle structure just described is adapted to be folded along the transverse score lines 2 and 3 to form an inverted U-shaped handle the leg portions 5 and 6 of which may be conveniently secured to the opposed walls 20 and 21 of a box 22 by means of staples 23 or other suitable attachment means inclusive of the adhesive engagement of the leg portions of the handle structure to the walls of the box.

When it is desired to put the handle in use, its construction is such that it will be folded to carrying position by the pressure of the hand which, in gripping the handle, doubles or folds the wing portions 10 and 11 along the longitudinal score lines 7 and 8, the wing portions thus turning upwardly the folding at substantially right angles to the central part 9, the diagonal score lines in the wing parts and in the leg portions permitting the necessary flexing of the board at the ends of the intermediate and leg portions. There is thus provided a handle structure which is channel-shaped in cross section, the angularly related wing parts 10 and 11 serving as reinforcing and rigidifying members and also acting as cushions for the user's hand as the handle is gripped.

The handle just described has a number of important advantages over a conventional carrying handle. Its channel shape greatly increases the strength of the handle so that it will actually support several times greater weight than a corresponding handle which is not of channel shape. Of particular advantage is the fact that the channel shape of the handle is formed automatically as the handle structure is grasped by the user. No attention need be given to the folding or manipulation of the parts, the mere act of picking up the box or container by the handle serving to enforce the folding of the parts. Still another advantage of the structure lies in the fact that the folded wing parts of the handle are comfortable to the hand, forming a cushion-like gripping element which is to some extent compressible in the hand of the user.

In Figure 1, I have illustrated the handle structure formed as an integral part of a collapsible box. This embodiment illustrates yet another advantage of the instant invention, and that is the ease with which the handle structure may be incorporated as an integral part of the carton structure and formed therewith without separate operations.

As seen in Figure 1, the box comprises a bottom 24 to which are connected wall panels 25, 26, 27 and 28. The wall panels 25 and 27 carry diagonally scored corner members 29, 30, 31 and 32 at their ends; and the remaining wall panels 26 and 28 are provided with attachment tabs 33 and 34, respectively. The handle member is formed as an integral extension of wall panel 27 and corner members 30 and 31, being separated from the wall panel by a line of cut 35 and severably attached to the corner members by the lines for severance 36 and 37.

The blank just described may be conveniently folded and glued on a right angle folding and gluing machine by first moving the blank in the direction of arrow A (Figure 1) whereupon adhesive will be applied to the diagonally scored corner members 29, 30, 31 and 32, as indicated by the glue areas 36, whereupon the corner members together with the wall panels 25 and 27 and the handle will be folded inwardly to the position illustrated in Figure 2 in which the glue area 36 will be brought into contact with underlying portions of the wall panels 26, 28, and the wall panels 25 and 27 juxtaposed to the bottom panel 24. The dimensioning of the parts is such that the handle member will be juxtaposed to the center portion of the blank with the leg forming portions 5 and 6 in alignment with the attachment tabs 33 and 34. The blank may then be moved at right angles to its initial direction of motion, as indicated by the arrow B in Figure 2, followed by the application of adhesive, indicated at 39, to the attachment tabs, whereupon the attachment tabs are infolded so as to bring them into adhesive engagement with the legs of the handle. The structure thus assumes the condition illustrated in Figure 3 which is the knocked-down or flat-folded form of the box.

Figures 3, 4, 5, 6, 9:
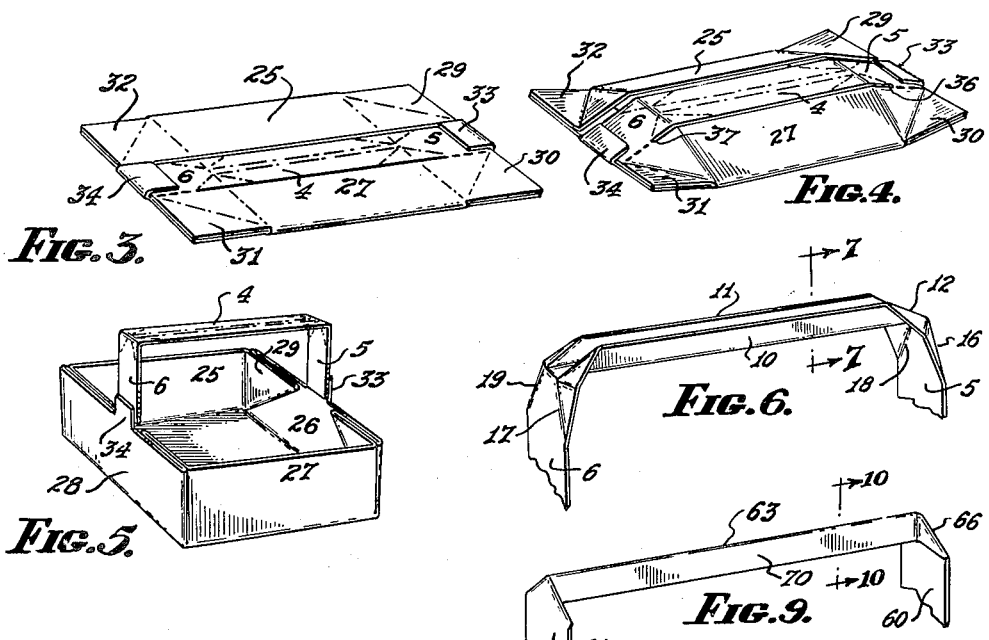
Figure 3 is a perspective view of the blank of Figure 2 with additional parts infolded and glued.
Figure 4 is a perspective view similar to Figure 3 illustrating the structure in partially erected condition.
Figure 5 is a perspective view of the box and handle structure in erected condition.
Figure 6 is an enlarged partial perspective view illustrating the manner in which the longitudinal portion of the handle structure is folded to provide a channel-shaped bail.
Figure 9 is a partial perspective view similar to Figure 6 illustrating the handle structure of Figure 8.

The box structure is squared-up or erected by lifting upwardly on the wall panels 25 and 27, in the manner illustrated in Figure 4, the erection of the wall panels 25 and 27 serving to automatically erect the remaining wall panels and the handle. The handle, it will be noted, not only automatically rises to handle-carrying position, but in addition it separates automatically from the remainder of the blank along the lines for severance 36 and 37. The structure thus assumes the erected position illustrated in Figure 5. It will be noted that the legs of the handle, when erected, are adhesively secured to the attachment tabs 33 and 34 in such fashion that there is no strip-apart or peel-away action between them, the face-to-face contact of the parts resulting in a strong attachment.

Figures 7, 10:
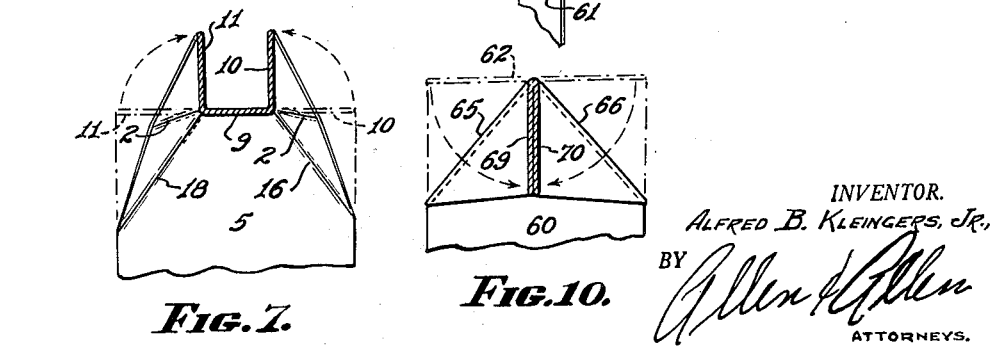
Figure 7 is a vertical sectional view taken along the line 7—7 of Figure 6.
Figure 10 is a vertical sectional view taken along the line 10—10 of Figure 9.

Following the erection of the box and the automatic expansion of the handle to carrying position, the wing parts 10 and 11 of the handle structure may be folded upwardly, in the manner illustrated in Figures 6 and 7, to form a reinforcing and rigidifying bail portion, the intermediate portion of the handle being permitted to flex by reason of the diagonal score lines 12 through 19 which permit the folding movement of the wing parts without disturbing the essentially planar condition of the leg portions 5 and 6.

Figure 11 illustrates the use of a handle structure in accordance with my invention with a modified form of blank having a bottom panel 40, wall panels 41, 42, 43 and 44. In this instance the panels 41 and 43 are provided with diagonal score lines 45 and corner connecting members 46, 47 and 48, 49 are connected to the ends of the wall panels 42 and 44 which also carry the attachment tabs 50 and 51. The handle member lies beyond the wall panel 43 and is detachably secured to the corner members 47 and 49 by means of the lines for severance 52 and 53.

In assembling this blank, the blank is first moved in the direction of the arrow C (Figure 11), whereupon the outlying parts of the blank are infolded to the position illustrated in Figure 12, including the reverse folding of the triangular portions of the wall panels 41 and 43 lying beyond the diagonal score line 45, the triangular portions being identified by the reference numerals 54, 55, 56 and 57. It will be noted that the infolding of the parts results in the juxtaposition of the handle member centrally of the bottom panel with the leg portions in alignment with the attachment tabs 50 and 51. The blank is then moved at right angles to its initial direction of movement, or in the direction of the arrow D (Figure 12), whereupon adhesive areas 58 are applied to the attachment tabs and the attachment tabs infolded and adhesively secured to the underlying ends of the leg portions 5 and 6. Adhesive is then applied to the reversely folded triangular portions 54—57, as indicated by the adhesive areas 59, followed by the infolding of the wall panels 42 and 44 and the corner members juxtaposed thereon, thereby bringing the blank to the condition illustrated in Figure 13, which is the knocked-down condition. It will be noted that the legs of the handle are infolded to overlie the bail forming portion during the folding and gluing operation. Thus, when the walls of the box are erected by lifting upwardly on the wall panels 42 and 44, the handle will remain in contact with the walls and bottom of the box in the manner illustrated in Figure 14; and the box may be used without raising the handle, if so desired. When it is desired to use the handle, its position may be reversed by lifting upwardly on the bail portion, thereby bringing it to the position illustrated in dotted lines.

Figure 15 illustrates a modification of the blank of Figure 11 wherein the handle is formed as an extension of the wall panel 42 rather than the wall panel 41, and the attachment tabs 50a and 51a are moved to the wall panels 41 and 43, lying intermediate the diagonal score lines 45. Where this is done, the handle member, upon the erection of the box, will automatically pop-up to the carrying position. In this embodiment the blank is first moved in the direction of the arrow E (Figure 16), whereupon the wall panels 41 and 43 are infolded, as are the corner members and the leg portions of the handle. The infolding of the wall panels is accompanied by the reverse folding of the triangular corner portions 54—57 and the attachment tabs 50a and 51a. As before, adhesive will be applied to the exposed surfaces of the triangular portions and the attachment tabs, the blank now being moved in the direction of the arrow F (Figure 16), followed by the infolding of the remaining wall panels 42 and 44 together with the corner members juxtaposed thereon. This results in bringing the blank to the knocked-down condition illustrated in Figure 17. It will be noted that the ends of the leg portions 5 and 6 of the handle are again brought into adhesive engagement with the attachment tabs 50a and 51a and the corner members adhesively secured to the triangular portions of the wall panels 41 and 43. This results in an extremely efficient and compact box structure. As illustrated in Figure 18, the blank is erected by lifting upwardly on the opposed wall panels 42 and 44 which serve to automatically erect the remaining wall panels together with the handle structure, the leg portions of the handle breaking away from the end members 46 and 47 along the lines for severance 52a and 53a. The erected condition of the box structure is shown in Figure 19.

While in the preceding embodiments I have described a handle structure the bail portion of which is divided into central and wing parts, it is also within the spirit of my invention to provide a reinforced handle the bail portion of which is divided into two foldable parts adapted to be folded downwardly as compared to the former embodiment wherein the wing parts are raised upwardly. Figure 8 illustrates such a handle as it would be associated with the box blank of Figure 1. The handle comprises leg portions 60 and 61 and an intermediate portion 62 divided by a centrally disposed longitudinal score line 63 which terminates at the transverse score lines 64 and 65 serving to separate the leg portions from the intermediate portion. Diagonal score lines 65, 66 and 67, 68 extend outwardly through the leg portions 60 and 61, respectively, to permit folding movement of the intermediate handle part.

The score line 63 divides the handle part into foldable halves 69 and 70. The manner in which the halves 69 and 70 are folded is illustrated in Figures 9 and 10. Upon being folded, the halves provide a reinforced and longitudinally rigidified bail portion for the handle structure.

As will be evident, it is within the spirit of my invention to provide the handle structures just described as separate elements apart from the box blank. Thus, as seen in Figure 22, the leg portions 60 and 61 may be provided at their ends with tongue members 71 and 72 by means of which the handle may be associated with a box 73 (Figure 23), the tongue portions being adapted to be inserted through slits 74 and 75 in opposed walls of the box. Similarly, the handle structure of Figure 20 may be provided at its ends with tongue members 76 and 77, as illustrated in Figure 24, for attachment to a set-up box. Such box may be conveniently in the form of a suit-box 78, as seen in Figure 25, the tongue portions passing through suitable slits in the top wall 79 of the box.

From the foregoing it will be apparent that the handle structures of the instant invention will find wide utility both as separate elements for attachment to set-up boxes and as integral parts of collapsible box blanks, the handles being associated with the boxes in their positions of use as an incident of the fabrication of the box blanks into knocked-down structures.

As will be evident from the foregoing description various modifications may be made in my invention without departing from the spirit of it, and I do not intend to be limited in ways other than as set forth in the claims which follow. Having thus described my invention in certain exemplary embodiments, what I desire to secure and protect by Letters Patent is:

1. In a blank for forming a collapsible box structure having a carrying handle formed as an integral part of the blank, which handle structure is adapted to be folded and glued as said blank is formed into a flat-folded carton structure, a rectangular bottom panel, wall panels articulated to the side edges of said bottom panel, corner connecting members hingedly connected to the end edges of an opposed pair of said wall panels, an elongated generally rectangular handle member lying immediately beyond one of said wall panels, said handle member being severably connected to the remainder of said blank and extending in parallel relation to the wall panel it adjoins with its end edges terminating substantially coterminous with the outer edges of the opposed pair of wall panels lying at right angles to said first named wall panel, attachment tabs hingedly connected to the outer edges of said last named pair of opposed wall panels, said attachment tabs being spaced from the line of articulation between said bottom panel and said first named wall panel by a distance at least equal to the width of said first named wall panel, whereby when said first named wall panel and the said handle member are infolded to overlie said bottom panel, the ends of said handle member will be in registry with said attachment tabs so that, upon infolding, said tabs may be secured to the ends of said handle member.

2. In a blank for forming a collapsible box structure having a carrying handle formed as an integral part of the blank and adapted to be folded and glued as said blank is formed into a flat-folded carton structure, a rectangular bottom panel, wall panels hingedly connected to the side edges of said bottom panel, corner connecting members hingedly connected to the end edges of an opposite pair of said wall panels, an elongated generally rectangular handle member lying immediately beyond one of said wall panels, said handle member being detachably connected to the remainder of said blank and extending in parallel relation to the wall panel it adjoins with its end edges terminating substantially coterminous with the outer edges of the opposed pair of wall panels lying at right angles to said first named wall panel, fold lines traversing said handle member in prolongation of the hinge lines connecting said last named pair of wall panels to said bottom panel, said fold lines dividing said handle member into an intermediate bail forming portion and outer leg forming portions, said bail forming portion being scored longitudinally to provide faces adapted to be folded relative to each other to form a longitudinally rigidified bail for said handle member, diagonal score-lines extending outwardly through said leg forming portions from the ends of said longitudinal scoring in said bail forming portion, and attachment tabs hingedly connected to the outer edges of said last named pair of opposed wall panels, said attachment tabs being spaced from the line of articulation contacting said first named wall panel to said bottom panel by a distance at least equal to the width of said first named wall panel, whereby when said first named wall panel and said handle member are infolded to overlie said bottom panel, the opposite ends of said handle member will be automatically aligned with said attachment tabs so that, upon infolding of said attachment tabs, they may be secured to said handle member.

3. The blank claimed in claim 2 wherein said corner connecting members are hingedly connected to the ends of said first named wall panel and the wall panel opposite thereto, and wherein said corner connecting members are divided by diagonal score lines extending outwardly therethrough from the corners of said bottom panel.

4. The blank claimed in claim 2 wherein said corner connecting members are connected to the end edges of said last named pair of opposed wall panels, and wherein said first named wall panel and the wall panel opposite thereto have diagonal score lines therein extending outwardly from the corners of said bottom panel.

5. The blank claimed in claim 2 wherein said corner connecting members are hingedly connected to the end edges of said first named wall panel and the wall panel opposite thereto, and wherein said last named pair of opposed body wall panels have diagonal scorelines therein extending outwardly from the corners of said bottom panel.

6. In a paperboard structure for use as a handle for a box, an elongated generally rectangular strip divided by transverse score lines to provide an intermediate bail forming portion and outer leg forming portions, said bail forming portions only being scored longitudinally to define a plurality of board faces adapted to be folded relative to each other to form a longitudinally rigidified bail, and diagonal score lines extending outwardly through said leg portions from the opposite ends of said longitudinal scoring, said diagonal score lines acting to permit relative folding of the faces of said bail forming portion when said leg forming portions are folded at substantially right angles to the plane of said bail-forming portion.

7. In a paperboard handle structure formed from an elongated generally rectangular strip of paperboard, transverse score lines extending between opposite side edges of said strip and dividing it into an intermediate bail forming portion and a pair of outer leg forming portions, said leg portions being foldable along said transverse score lines at right angles to said bail forming portions to form an inverted U-shaped handle, a pair of spaced apart longitudinal score lines in said intermediate part extending between said transverse score lines and dividing said intermediate part into a horizontally disposed center portion and a pair of foldable wing portions, and diagonally disposed scorelines extending outwardly from the ends of said longitudinal score lines through both said wing portions and said leg portions, said wing portions when folded upwardly relative to said center portion forming a generally channel shape rigidified bail for said handle structure.

References Cited in the file of this patent

UNITED STATES PATENTS

| | | |
|---|---|---|
| 1,707,528 | Bombard | Apr. 2, 1929 |
| 1,860,349 | Larkin | May 31, 1932 |
| 2,021,559 | Lengsfield | Nov. 19, 1935 |
| 2,109,034 | Seifer | Feb. 22, 1938 |
| 2,124,955 | Quagliotti | July 26, 1938 |
| 2,252,023 | Mulnix | Aug. 12, 1941 |
| 2,359,298 | Brogden | Oct. 3, 1944 |
| 2,401,664 | Robins | June 4, 1946 |
| 2,645,406 | Robins | July 14, 1953 |
| 2,662,684 | Robins | Dec. 15, 1953 |
| 2,687,247 | Chidsey | Aug. 24, 1954 |
| 2,714,343 | Baker | Aug. 2, 1955 |
| 2,772,610 | Arneson | Dec. 4, 1956 |
| 2,795,367 | Feldman et al. | Jan. 11, 1957 |
| 2,851,211 | Beregstein | Sept. 9, 1958 |